(12) United States Patent
Stiehler et al.

(10) Patent No.: US 10,001,016 B2
(45) Date of Patent: Jun. 19, 2018

(54) TURBOMACHINE BLADE HAVING A MAIN BODY INCLUDING A PLANE FIRST ATTACHMENT SURFACE

(71) Applicant: MTU Aero Engines AG, Munich (DE)

(72) Inventors: Frank Stiehler, Bad Liebenwerda (DE); Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 243 days.

(21) Appl. No.: 14/795,017

(22) Filed: Jul. 9, 2015

(65) Prior Publication Data
US 2016/0010462 A1   Jan. 14, 2016

(30) Foreign Application Priority Data
Jul. 11, 2014   (EP) .................................. 14176766.5

(51) Int. Cl.
*F01D 5/16*   (2006.01)
*B23P 15/04*   (2006.01)
*F01D 5/26*   (2006.01)

(52) U.S. Cl.
CPC ................ *F01D 5/16* (2013.01); *B23P 15/04* (2013.01); *F01D 5/26* (2013.01); *F05D 2230/232* (2013.01)

(58) Field of Classification Search
CPC ..... F01D 5/10; F01D 5/16; F01D 5/26; F05D 2230/232; F05D 2230/233; F05D 2230/234; F05D 2260/96; F05D 2260/961; B23P 15/04
See application file for complete search history.

(56) References Cited

U.S. PATENT DOCUMENTS

| 1,856,786 | A | * | 5/1932 | Rice | .......................... F01D 5/10 |
| | | | | | 416/145 |
| 2,349,187 | A | * | 5/1944 | Meyer | ....................... F01D 5/16 |
| | | | | | 188/322.5 |
| 2,689,107 | A | | 9/1954 | Odegaard | |
| 4,833,295 | A | * | 5/1989 | Locker | ..................... F16H 41/24 |
| | | | | | 219/121.13 |
| 2003/0202883 | A1 | | 10/2003 | Davis et al. | |
| 2012/0233859 | A1 | * | 9/2012 | Cattiez | ................. B21D 26/021 |
| | | | | | 29/889.7 |
| 2013/0294913 | A1 | * | 11/2013 | Campbell | ................. F01D 5/16 |
| | | | | | 416/145 |

FOREIGN PATENT DOCUMENTS

| DE | 102009010185 A1 | * | 8/2010 | ............... F01D 5/16 |
| EP | 2484870 | | 8/2012 | |
| FR | 2522364 A1 | * | 9/1983 | ............... F01D 5/16 |

OTHER PUBLICATIONS

Machine Translation of FR 2522364 A1.*
Machine Translation of DE 102009010185 A1.*

* cited by examiner

*Primary Examiner* — Woody Lee, Jr.
*Assistant Examiner* — Elton Wong
(74) *Attorney, Agent, or Firm* — Davidson, Davidson & Kappel, LLC

(57) ABSTRACT

A turbomachine blade having a main body (10) that includes a plane, first attachment surface (100) having a first rim contour (110), a cover (20; 21, 22) that has a plane, second attachment surface (200) having a second rim contour (210) that is welded to the first attachment surface, and a tuning body configuration having at least one tuning body (30; 31-33) for contacting an inner wall (220) of the cover by impact therewith, a gap (s) being formed between the first and the second rim contour.

24 Claims, 2 Drawing Sheets

TURBOMACHINE BLADE HAVING A MAIN BODY INCLUDING A PLANE FIRST ATTACHMENT SURFACE

This claims the benefit of European Patent Application EP 14176766.5, filed Jul. 11, 2014 and hereby incorporated by reference herein.

The European Union's Seventh Framework Program (FP7/2007-2013) for the Clean Sky Joint Technology Initiative has funded the work leading to this invention under Grant Agreement no. CSJU-GAM-SAGE-2008-001.

BACKGROUND

The present invention relates to a turbomachine blade having at least one tuning body, to a turbomachine, in particular a gas turbine having such a turbomachine blade, as well as to a method for manufacturing such a turbomachine blade.

The European Patent Application EP 2 484 870 A1 describes a turbomachine blade having a blade neck within which a spherical cap is formed that can optionally accommodate different tuning body housings. Different tuning bodies are individually guided therein in order to form different configurations for test purposes or for various operating conditions.

The tuning bodies are provided for impact contact with the blade. Surprisingly, it has been found that such striking tuning bodies can significantly improve the frequency response of the blade to excited vibrations, in particular aero- or structural-dynamically, allowing the blades to thus be "detuned."

The tuning body housings are accommodated in the spherical cap and secured by soldering. For that reason, the spherical cap can influence a thermal expansion of the tuning body housing and thus the geometry and/or attachment thereof that are precisely adjusted for the desired impact contacts.

SUMMARY OF THE INVENTION

It is an object of the present invention to provide an improved turbomachine.

The present invention provides a turbomachine blade that has a single- or multi-part main body. In an embodiment, this may be produced by primary shaping, in particular by casting, and/or machining, in particular with geometrically defined cutting edges, for instance by milling, and/or with geometrically undefined cutting edges, for instance by grinding. An embodiment provides that the main body have an airfoil for deflecting the flow of a working gas, in particular air to be compressed, that is supplied to a combustion chamber of a gas turbine, or exhaust gas from such a combustion chamber. An inner shroud may be configured radially inwardly on the airfoil and/or an outer shroud may be configured radially outwardly thereon. An embodiment provides that the main body be joined form-lockingly and/or by a material-to-material bond to a rotor or housing of the turbomachine; in a further refinement, by a blade root that is configured radially inwardly from the airfoil. Similarly, the main body may be integrally formed with a rotor or housing of the turbomachine.

The main body has a plane, first attachment surface having a first rim contour. Welded thereto is a plane, second attachment surface of a separately formed cover that has a second, preferably concentric rim contour that, in particular, is congruent to the first rim contour. In an embodiment, the first and/or second rim contour are circular which, in particular, may facilitate manufacturing.

In a manner described in greater detail below, a tuning body configuration having at least one tuning body for contacting an inner wall of the cover by impact therewith, is configured, respectively accommodated in one or a plurality of cavities. In the present case, as well as in the European Patent Application EP 2 484 870 A1 mentioned at the outset, a contacting of an inner wall by impact therewith is understood to be a single, also multiple momentary contacting of one or both impact partners, elastically and/or plastic deforming the same, with complete conservation or exchange of momentum.

In accordance with one aspect of the present invention, a gap is formed between the first and the second smaller rim contour. In an embodiment, this advantageously facilitates a thermal expansion in the case of welding and/or during operation of the turbomachine blade, particularly in conjunction with the plane attachment surfaces. In an embodiment, this makes it advantageously possible to minimize, preferably prevent any influencing of a geometry and/or of an attachment of the cover whose inner wall is precisely adjusted for the impact contact. To this end, in particular, an embodiment provides that the cover be attached to the main body in a way that allows it to extend freely therefrom, respectively that it make contact with the same only by the second attachment surface thereof. In an embodiment, at 20° C., the gap is at least 1 mm, in particular at least 2 mm, and/or at most 10 mm, in particular at most 20 mm. Larger gaps may unnecessarily increase the outlay required for manufacturing the first attachment surfaces; smaller gaps may degrade the advantageous action explained above, in particular the unrestricted thermal expansion of the cover.

An embodiment provides that one or a plurality of, in particular all tuning bodies of the tuning body configuration be accommodated in one or a plurality of cavities that are each completely formed in the cover. In an embodiment, the tuning body configuration may be hereby, at least partially "preassembled" in the cover, and the cover subsequently welded, together with the partially or completely preassembled tuning body configuration, to the base body. Thus, additionally or alternatively, an embodiment makes it possible to reduce, or preferably avoid, a more complicated formation of cavities.

To this end, in particular, an embodiment allows the cover to be configured to be multipart, in particular two-part, having a main body-proximal lower part and a main body-distal upper part; the cavity, respectively cavities, which is/are entirely formed in the cover, each having at least two sections that communicate with one another, in particular being constituted thereof, of which one is formed in one part, in particular the lower part, and the other in a part joined thereto, in particular the upper part.

In an embodiment, two or more, in particular all parts of the multipart cover are joined together in the same manner as the cover, respectively the main body-proximal lower part thereof, to the main body. In particular, they may have welded together, preferably plane attachment surfaces, between whose rim contours, a gap may be preferably formed in each case. The advantages described for attaching the cover to the main body also apply then for attaching the cover parts to one another. Likewise, in another embodiment, two or more, in particular all parts of the multipart cover may also be joined together differently from the cover, respectively the main body-proximal lower part thereof, to the main body. On the one hand, the advantages described for attaching the cover to the main body may be achieved and, at the same time, other advantages for attaching the cover parts to one another may be combined, for example, to attain a simpler and/or more reliable attachment.

In an embodiment, one or a plurality of, in particular all tuning bodies of the tuning body configuration are accommodated in one or a plurality of cavities, of which at least one section is formed in the main body in each case. In a further refinement, one or a plurality of, in particular all of these cavities are each completely formed in the main body. In another embodiment, in each case, one first section of one or a plurality of, in particular of all of these cavities is configured in the main body, and a second section of this cavity is configured in the cover. In an embodiment, this makes it possible for the cover to advantageously have a flatter construction. In an embodiment, the first section formed in the main body has less than 40%, in particular less than 30% of a volume of the second section formed in the cover. In another embodiment, the first section configured in the main body has more than 60%, in particular more than 70% of a volume of the second section configured in the cover. An especially advantageous detuning may be hereby achieved in each case.

In particular, to seal one or a plurality of cavities or cavity sections that are entirely formed in the main body, in an embodiment, the cover may be formed in one piece and/or feature a traversing, plane base surface that faces the base space [(sic.) the main body] and forms the second attachment surface and the inner wall for the impact-based contacting thereof.

The two embodiments above may be combined in that one or a plurality of cavities may be entirely formed in the cover, and one or a plurality of further cavities may be formed, at least in sections thereof, in the main body. In an alternative embodiment, as explained above, all of the cavities are entirely formed in the cover, or all cavities are formed, at least in sections thereof, in the main body, in particular, in each case, entirely in the main body or in sections thereof in the main body and in sections thereof in the cover.

In an embodiment, at least two cavities, in particular at least two cavities entirely formed in the cover or main body, at least two cavities formed in each case in sections thereof in the cover and in sections thereof in the main body, or at least one cavity entirely formed in the cover or main body and at least one cavity formed in each case in sections thereof in the cover and in sections thereof in the main body or entirely in the main body, respectively the cover, have different shapes, respectively geometries and/or different volumes.

One or a plurality of tuning bodies of the tuning body configuration is/are accommodated in each case in one or a plurality of these different cavities. In a further refinement, one or a plurality of tuning bodies of the tuning body configuration are accommodated in all of these different cavities. A detuning of different frequencies and/or under different operating conditions may hereby advantageously take place.

Another refinement provides that no tuning body of the tuning body configuration be accommodated in at least one of these different cavities. Different cavities may hereby be advantageously selectively populated with tuning bodies. Additionally or alternatively, such an unpopulated cavity may advantageously serve as a volume for receiving welding material.

In particular, a circumferentially extending groove may be formed in the first and/or second attachment surface between one or a plurality of cavities in which at least one tuning body of the tuning body configuration is accommodated in each case. This makes it advantageously possible to reduce, preferably prevent any penetration of molten, respectively welding material during welding into the cavity/cavities having the tuning body/bodies.

In an embodiment, exactly one tuning body is accommodated, respectively disposed in one or a plurality of, preferably in all cavities, in particular cavities that are entirely formed in the cover, cavities that, at least in sections thereof, are formed in the main body, and/or cavities having different shapes and/or volumes. An embodiment advantageously provides that an impact characteristic be individually adaptable.

Additionally or alternatively, two or more tuning bodies are accommodated, respectively disposed in each case in one or a plurality of, preferably in all cavities, in particular cavities that are entirely formed in the cover, cavities that, at least in sections thereof, are formed in the main body, and/or cavities having different shapes and/or volumes. In addition, in an embodiment, tuning bodies may advantageously strike one another.

In an embodiment, one or a plurality of, preferably all tuning bodies of the tuning body configuration accommodated in a cavity may have a maximum clearance of motion of between 0.5 mm and 1.5 mm, in each case, in at least one or one single direction of degree of freedom of impact. In an embodiment, an advantageous impact kinetics may be hereby provided. Additionally or alternatively, in an embodiment, the clearance of motion in the direction of degree of freedom of impact is, in particular, at least four times a guide clearance in a guide direction orthogonally to the direction of degree of freedom of impact. In one further refinement, the guide clearance is preferably less than 0.3 mm, in particular less than 0.1 mm. In an embodiment, one or a plurality of, preferably all tuning bodies of the tuning body configuration accommodated in a cavity each have a maximum clearance of motion of between 0.5 mm and 1.5 mm, in each case, in two or three mutually orthogonal directions of degree of freedom of impact. In particular, different eigenmodes may be hereby advantageously detuned.

In an embodiment, one or a plurality of, preferably all tuning bodies of the tuning body configuration is/are each accommodated in a cavity that is airtight. An interchange of gases during operation and/or an ingress of liquid may hereby be advantageously prevented. Accordingly, in an embodiment, the cavity/cavities is/are air-filled, respectively free of liquids. As explained at the outset, the advantageous detuning of the frequency response is not based on dissipative damping, as is conventionally aimed for by the friction of damping elements against cavity walls and/or in liquid; instead, a most unhindered possible impact kinetics is advantageous.

In an embodiment, the first and/or second attachment surface and/or, in particular, the plane attachment surfaces of two or more cover parts of a multipart cover, that are joined together, in particular welded, are produced by primary shaping, preferably by casting. These attachment surfaces may be hereby manufactured simply and/or economically. In another embodiment, the first and/or second attachment surface and/or, in particular, the plane attachment surfaces of two or more cover parts of a multipart cover, that are joined together, in particular welded, are produced by machining, in particular with a geometrically defined cutting edge, preferably by milling, or with a geometrically undefined cutting edge, preferably by grinding. This attachment surface may be hereby precisely manufactured, and/or blades may be subsequently detuned.

In an embodiment, the first and second attachment surface and/or, in particular, the plane attachment surfaces of two or more cover parts of a multipart cover, that are welded together, are welded together without welding filler material. This makes it possible to minimize, preferably prevent any degradation of the impact characteristic caused during welding by filler material entering into a cavity having tuning bodies.

In an embodiment, the first attachment surface is disposed radially inwardly from an airfoil of the turbomachine blade, in particular on a surface of an inner shroud facing away from the airfoil, or radially outwardly from the airfoil, in particular on a surface of an outer shroud facing away from an airfoil. The frequency response may be considerably influenced by disposing the first attachment surface radially outwardly. Disposing the first attachment surface radially inwardly makes possible a lower moment of inertia of the turbomachine blade and/or the use of a larger installation space.

In accordance with one aspect of the present invention, a turbomachine blade described here is used as a guide vane or rotor blade of a guide vane cascade or rotor blade cascade of a compressor stage or turbine stage of a turbomachine, in particular a gas turbine.

To manufacture a turbomachine blade described here, one aspect of the present invention provides that the tuning body/bodies of the tuning body configuration be disposed in the cavity/cavities.

Subsequently thereto, in particular, the plane, second attachment surface of the cover is welded to the plane, first attachment surface of the main body in a way that allows the gap to be formed between the first and the second rim contour.

BRIEF DESCRIPTION OF THE DRAWINGS

Further advantageous embodiments of the present invention will become apparent from the dependent claims and the following description of preferred embodiments. To this end, the drawings show, partly in schematic form, in:

DETAILED DESCRIPTION

Figure 1:
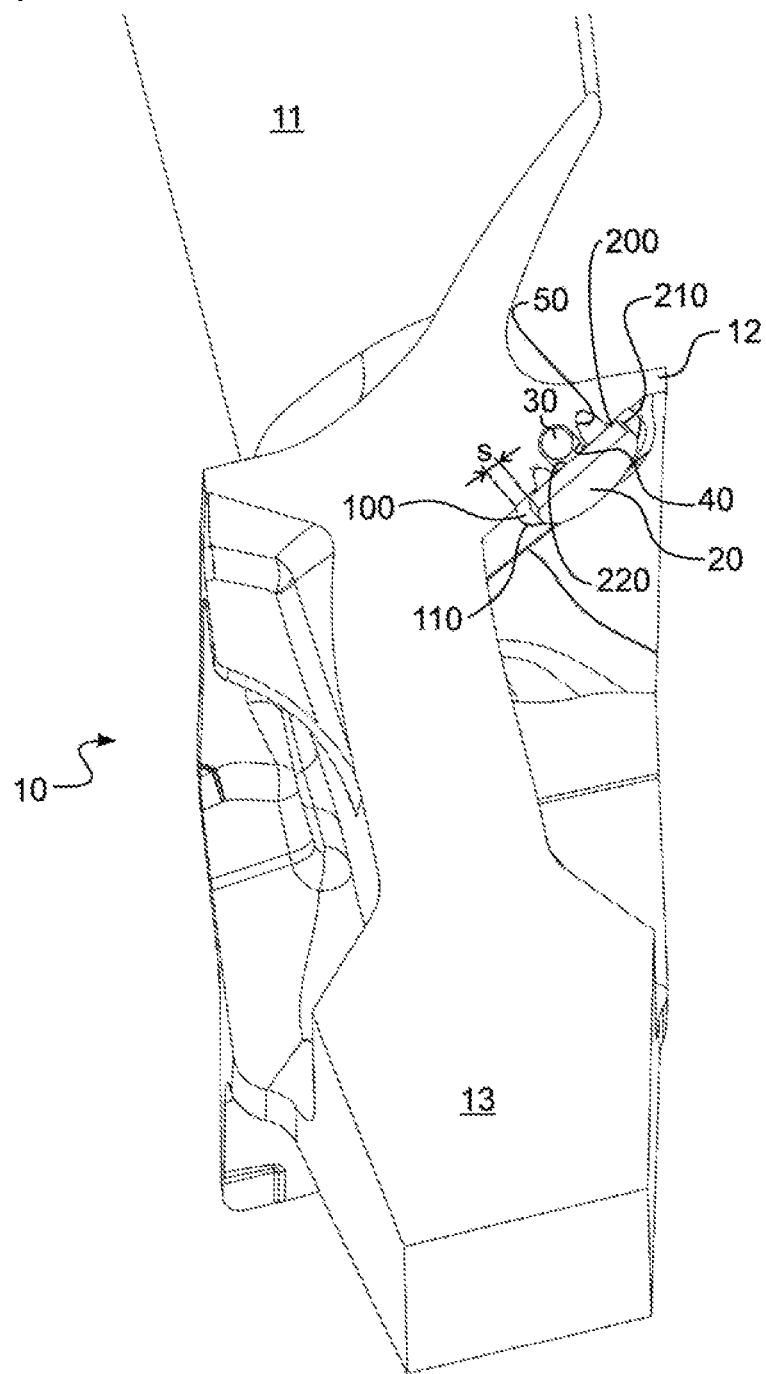
FIG. 1: a perspective, part-sectional view of a blade of a turbomachine in accordance with an embodiment of the present invention; and in FIG. 2: a perspective, part-sectional view of a blade of a turbomachine in accordance with another embodiment of the present invention.

FIG. 1 shows a perspective, part-sectional view of a blade of a turbomachine in accordance with an embodiment of the present invention.

The blade has a main body 10 having an airfoil 11, a radially inner shroud 12, and a blade root 13.

Main body 10 has a plane, first attachment surface 100 having a circular first rim contour 110. Welded thereto is a plane, second attachment surface 200 of a separately formed cover 20 that has a circular, second rim contour 210 that is concentric to the first rim contour 110.

A gap s is formed between this first rim contour 110 and this second smaller rim contour 210. Cover 20 is attached to main body 10 in a way that allows it to extend freely therefrom, respectively, it makes contact with the same only by second attachment surface 200 thereof.

In addition, turbomachine blade features a tuning body configuration having a single spherical tuning body 30 that is accommodated in a cavity 40.

In the embodiment of FIG. 1, this cavity 40, as well as a circumferentially extending groove 50 of varying height between this cavity 40 and second rim contour 210 are entirely formed in each case in main body 10, so that groove 50 is configured in first attachment surface 100. Cavity 40 and groove 50 are sealed by an inner wall 220 of cover 20 that, in this embodiment, together with second attachment surface 200, form the traversing, plane bottom side of one-part cover 20 that faces the main body.

Additionally or alternatively to circumferentially extending groove 50, other cavities may also be provided that are each populated with one or a plurality of tuning bodies or are not populated with any tuning bodies. Such additional cavities may have different shapes, respectively geometries and/or different volumes. Thus, in the part-sectional view of FIG. 1, an embodiment having two further unpopulated cavities of different volumes corresponds to the above-described embodiment having a circumferentially extending groove 50, the two cross-sectional areas of groove 50 that are discernible in the part-sectional view then representing cross-sectional areas of these two further cavities.

In one direction of degree of freedom of impact (diagonally from the upper left to the lower right in FIG. 1), tuning body 30 has a clearance of motion that is between 0.5 mm and 1.5 mm. On the other hand, in one guide direction (diagonally from the lower left to the upper right in FIG. 1), orthogonally to this direction of degree of freedom of impact, a guide clearance is less than 0.3 mm, in particular less than 0.1 mm.

First and second attachment surfaces 100, 200 are welded together airtight, without filler material, so that cavity 40 is airtight and air-filled, respectively free of liquids.

First attachment surface 100 is configured radially inwardly from airfoil 11 of turbomachine blade 10 on the surface of inner shroud 12 facing away from the airfoil.

To manufacture the turbomachine blade described here, cavity 40 and circumferentially extending groove, respectively further cavities 50 are produced in main body 10. First attachment surface 100 is produced in advance, in the process, or subsequently. Tuning body 30 is then configured in the cavity. Subsequently thereto, plane, second attachment surface 200 of cover 20 is welded to plane, first attachment surface 100 of main body 10 in a way that allows gap s to be formed between first and second rim contour 110, 210.

Figure 2:
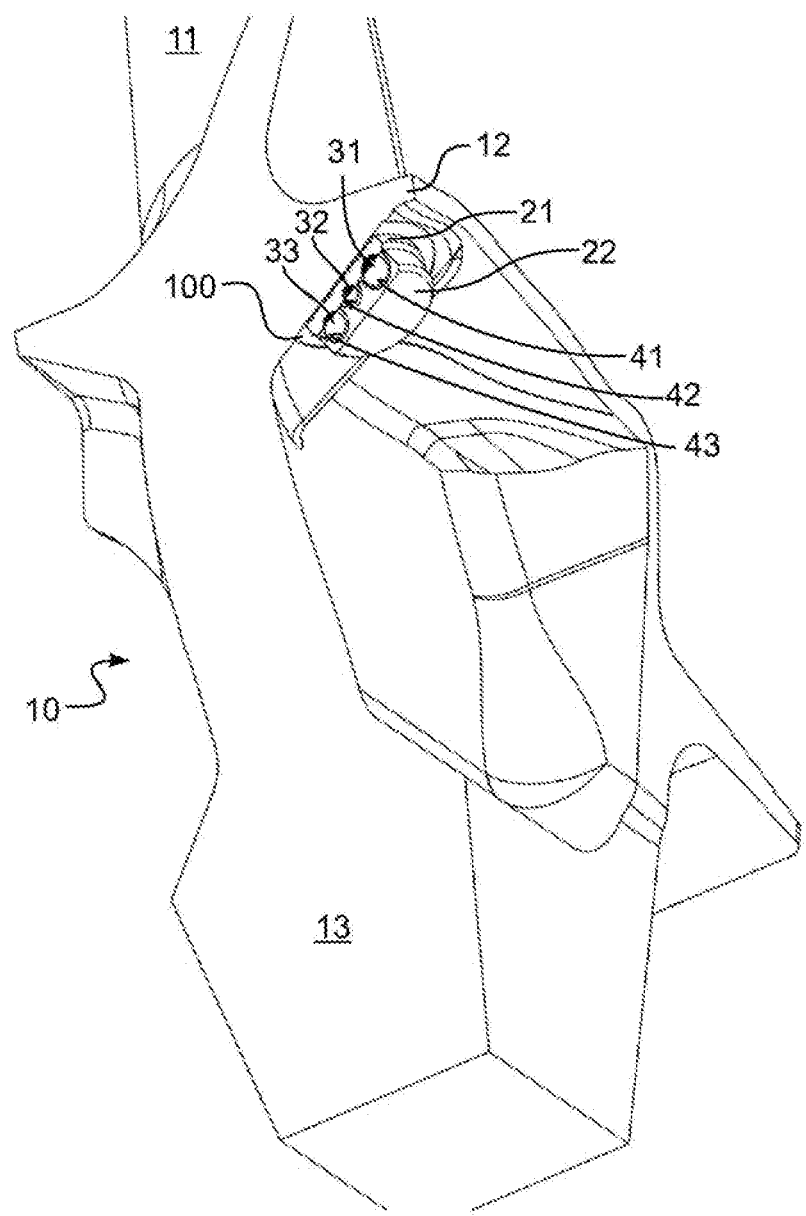

In a view similar to that of FIG. 1, FIG. 2 shows a blade of a turbomachine in accordance with another embodiment of the present invention. Corresponding features are identified by identical reference numerals, so that reference is made to the above description, and only the differences will be discussed below.

In the embodiment of FIG. 2, three different tuning bodies 31-33 are each individually accommodated in a cavity 41, 42, respectively 43. These cavities 41-43 are each entirely formed in the cover.

To this end, in the embodiment of FIG. 2, the cover is configured in two parts, including a main body-proximal lower part 21 and a main body-distal upper part 22; cavities 41-43 entirely formed in the cover each being constituted of two sections that communicate with one another, of which one is configured in the lower part, and the other in the upper part joined thereto. The areas of tuning bodies 31-33, that are configured in the sections in lower part 21 of the cover, are colored in black solely for illustration purposes.

The upper and lower part of the multipart cover are joined together in the same manner as the cover, respectively main body-proximal lower part 21 thereof, to main body 10. Accordingly, they feature welded together, plane attachment surfaces.

In the embodiment of FIG. 2, the walls of cavities 41-43 entirely configured in the cover form the inner wall of the two-part cover for tuning bodies 31-33 to contact the same by impact therewith.

Although exemplary embodiments are explained in the preceding description, it is noted that many modifications are possible.

It should also be appreciated that the exemplary embodiments are merely examples and are in no way intended to restrict the scope of protection, the uses, or the design. Rather, the preceding description provides one skilled in the art with a guideline for realizing at least one exemplary design, it being possible for various modifications to be made, particularly with regard to the function and configuration of the described components, without departing from the scope of protection as is derived from the claims and the combinations of features equivalent thereto.

LIST OF REFERENCE NUMERALS

10 main body
11 airfoil
12 inner shroud
13 blade root
20 cover
21 lower part
22 upper part
30-33 tuning body
40-43 cavity
50 groove/further cavity
100 first attachment surface
110 first rim contour
200 second attachment surface
210 second rim contour
220 inner cover wall
s gap

What is claimed is:

1. A turbomachine blade comprising:
a main body including a plane, first attachment surface having a first rim contour; and
a cover including a plane, second attachment surface having a second rim contour and welded to the first attachment surface; and
a tuning body configuration having at least one tuning body for contacting an inner wall of the cover by impact therewith, a gap being formed between the first and second rim contour;
wherein the first attachment surface is configured radially inwardly or outwardly from an airfoil for flow deflection on a surface of an inner or outer shroud facing away from the airfoil.

2. The turbomachine blade as recited in claim 1 wherein the cover is disposed on the main body in a way that allows the cover to extend freely therefrom.

3. The turbomachine blade as recited in claim 1 wherein at least one tuning body of the tuning body configuration is accommodated in a cavity completely formed in the cover.

4. The turbomachine blade as recited in claim 1 wherein the cover is a multipart cover.

5. The turbomachine blade as recited in claim 1 wherein at least one tuning body of the tuning body configuration is accommodated in a cavity formed at least in sections thereof in the main body.

6. The turbomachine blade as recited in claim 1 further comprising at least two cavities having a different shape or different volume; at least one tuning body of the tuning body configuration being accommodated in at least one of these cavities.

7. The turbomachine blade as recited in claim 1 wherein at least one tuning body of the tuning body configuration is accommodated in a cavity; a circumferentially extending groove being formed in the first or second attachment surface between the cavity and the second rim contour.

8. The turbomachine blade as recited in claim 1 wherein at least one tuning body of the tuning body configuration is accommodated in a cavity and has a clearance of motion in a direction of degree of freedom of impact that is at least twice a guide clearance in a guide direction orthogonally to the direction of degree of freedom of impact or is between 0.5 mm and 1.5 mm.

9. The turbomachine blade as recited in claim 1 wherein at least one tuning body of the tuning body configuration is accommodated in a cavity and has a clearance of motion in a direction of degree of freedom of impact that is at least four times a guide clearance in a guide direction orthogonally to the direction of degree of freedom of impact or is between 0.5 mm and 1.5 mm.

10. The turbomachine blade as recited in claim 1 wherein at least one tuning body of the tuning body configuration is accommodated in a cavity, the cavity being airtight.

11. The turbomachine blade according to claim 10, wherein the first and the second attachment surface are welded together without filler material.

12. The turbomachine blade as recited in claim 1 wherein the first or second attachment surface is produced by primary shaping or by casting.

13. The turbomachine blade as recited in claim 1 wherein the first and the second attachment surface are welded together without filler material.

14. A turbomachine comprising:
at least one compressor stage or turbine stage having at least one guide vane cascade or rotor blade cascade having at least one turbomachine blade as recited in claim 1.

15. A gas turbine comprising the turbomachine as recited in claim 14.

16. A method for manufacturing a turbomachine blade as recited in claim 1, the method comprising:
disposing the tuning bodies of the tuning body configuration in at least one cavity formed at least in sections thereof in the cover or the main body.

17. The method as recited in claim 16 further comprising, subsequently to the disposing step, welding the plane, second attachment surface of the cover to the plane, first attachment surface of the main body in a way that allows the gap to be formed between the first and second rim contour.

18. The method as recited in claim 17 wherein the first and the second attachment surface are welded together without filler material.

19. The method as recited in claim 16 wherein the first or second attachment surface is produced by primary shaping or by casting.

20. The turbomachine blade according to claim 1, wherein the first attachment surface is disposed solely radially inwardly from the airfoil.

21. A turbomachine blade comprising:
a main body including a plane, first attachment surface having a first rim contour; and a cover including a plane, second attachment surface having a second rim contour and welded to the first attachment surface; and a tuning body configuration having at least one tuning body for contacting an inner wall of the cover by impact therewith, a gap being formed between the first and second rim contour, wherein at least one tuning body of the tuning body configuration is accommodated in a cavity completely formed in the cover.

22. A turbomachine blade comprising:

a main body including a plane, first attachment surface having a first rim contour; and a cover including a plane, second attachment surface having a second rim contour and welded to the first attachment surface, wherein the cover is a multipart cover; and a tuning body configuration having at least one tuning body for contacting an inner wall of the cover by impact therewith, a gap being formed between the first and second rim contour.

23. A turbomachine blade comprising:

a main body including a plane, first attachment surface having a first rim contour; and a cover including a plane, second attachment surface having a second rim contour and welded to the first attachment surface;

a tuning body configuration having at least one tuning body for contacting an inner wall of the cover by impact therewith, a gap being formed between the first and second rim contour;

at least two cavities having a different shape or different volume, at least one tuning body of the tuning body configuration being accommodated in at least one of these cavities.

24. A turbomachine blade comprising:

a main body including a plane, first attachment surface having a first rim contour; and a cover including a plane, second attachment surface having a second rim contour and welded to the first attachment surface; and a tuning body configuration having at least one tuning body for contacting an inner wall of the cover by impact therewith, a gap being formed between the first and second rim contour, wherein at least one tuning body of the tuning body configuration is accommodated in a cavity, a circumferentially extending groove being formed in the first or second attachment surface between the cavity and the second rim contour.

\* \* \* \* \*